UNITED STATES PATENT OFFICE.

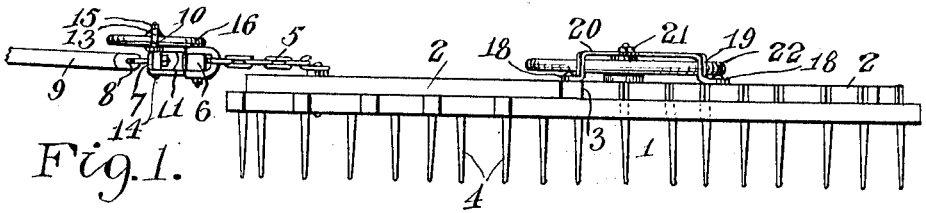

OSCAR W. PETERSON, OF RIPON, CALIFORNIA.

AGRICULTURAL IMPLEMENT.

1,048,340.  Specification of Letters Patent.  Patented Dec. 24, 1912.

Application filed July 10, 1911. Serial No. 637,770.

*To all whom it may concern:*

Be it known that I, OSCAR W. PETERSON, a citizen of the United States, residing at Ripon, in the county of San Joaquin and State of California, have invented certain new and useful Improvements in Agricultural Implements, of which the following is a specification.

My invention relates to improvements in agricultural implements, and has for its principal object the provision of an improved attachment for agricultural implements for protecting growing trees from being barked by the implement while it is being drawn through the orchard.

A further object of my invention is the provision of an attachment for agricultural implements particularly adapted for use in conjunction with ordinary toothed drag harrows, for preventing the double or swingle trees connected to the harrow or the frame bars of the harrow from striking against the stems of the growing trees and barking or scratching the same.

Other objects and advantages of my improved device will be readily apparent from the following description taken in connection with the accompanying drawings, and it will be understood that I may make any modifications in the specific structure shown and described within the scope of my claim without departing from or exceeding the spirit of the invention.

Figure 1 represents a side elevation of a harrow equipped with my improvement. Fig. 2 represents a top plan view of the device shown in Fig. 1. Fig. 3 represents a sectional view on the line 3—3 of Fig. 2, and Fig. 4 represents a perspective view of the brackets carried by the harrow frame for supporting the main guide wheel.

In the drawings, the numeral 1 designates the frame bars of my harrow, said frame bars being connected by the transverse bars 2 and being further braced by the diagonal brace member 3, the bars 1 having secured therein the usual depending harrow teeth 4. Secured to one of the cross bars 2 near one end thereof is the chain 5 having its other end secured to the double tree 6 which bears the pair of swingle trees 7 suitably secured thereto, said swingle trees having the hooks 8 for engaging the leather tug straps 9.

Secured to the swingle trees 7 by the bolt 10 which also serves as the pivot for the swingle tree and has its ends engaged in the clevis 11 of the double tree is the plate 12 which rests on the outer portion of the swingle tree and has a reversely extending brace portion 13 projecting outward and upward from the main portion 12 of the plate, a vertically disposed bolt 14 projecting upward through the swingle tree and plate 12 and having its upper end secured to the arm 13 by the nut 15. Said bolt 14 serves as an axle for the small wheel 16 which is provided with the rubber or cushion tire 17, the rim of said wheel projecting outward beyond the end of the swingle tree.

Secured to the rear cross bar 2 and to the diagonal brace member 3 are the ends 18 of the bracket members having the offsets 19 and the outwardly extending converging arms 20 which unite above the cross bar 2, while passing through the intersecting arms 20 and through the cross bars 2 is the axle bolt 21 for the large wheel 22 which has the resilient or cushion tire 23, said wheel being thus securely rotatably supported on the axle bolt 21 which is braced by the bracket and having its tire projecting outward beyond the corner or side of the harrow.

From the foregoing description taken in connection with the drawings, and the construction of my improved attachment for agricultural implements it will be seen that I have provided an improved attachment, which, while shown as applied to a harrow may be applied to any similar agricultural implement and in which the resiliently tired wheels project outward beyond the edges of the draft trees and of the frame of the implement and will serve to thus contact with the trunks of the trees and guide out of engagement therewith the frame which would otherwise bruise or bark the trunks.

I claim:—

The combination with a swingle tree, of a plate carried thereby and having a reversely bent brace portion spaced therefrom, bolts passing through the swingle tree, plates and brace portions, a wheel rotatably mounted upon one of said bolts and between the brace portion and plate, the rim of said wheel extending beyond the outer end of the swingle tree, as and for the purpose set forth.

In testimony whereof I affix my signature, in the presence of two witnesses.

OSCAR W. PETERSON.

Witnesses:
STUART THOMSON,
JAMES R. ROBBINS.

Copies of this patent may be obtained for five cents each, by addressing the "Commissioner of Patents, Washington, D. C."